United States Patent
Nishikawa

(10) Patent No.: US 9,069,505 B2
(45) Date of Patent: Jun. 30, 2015

(54) IMAGE FORMING SYSTEM SETTING CONDITION FOR EXECUTING ACQUISITION PROCESS

(75) Inventor: Naoki Nishikawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 692 days.

(21) Appl. No.: 12/881,497

(22) Filed: Sep. 14, 2010

(65) Prior Publication Data

US 2011/0157624 A1 Jun. 30, 2011

(30) Foreign Application Priority Data

Dec. 25, 2009 (JP) .................................. 2009-293734

(51) Int. Cl.
*G06F 3/12* (2006.01)
*G06K 15/00* (2006.01)
(Continued)

(52) U.S. Cl.
CPC ...... *G06F 3/126* (2013.01); *G03G 2215/00126* (2013.01); *G03G 2215/0161* (2013.01); *G06F 3/1211* (2013.01); *G06F 3/1229* (2013.01); *G06F 3/1285* (2013.01); *H04N 1/00015* (2013.01); *H04N 1/00031* (2013.01); *H04N 1/00053* (2013.01); *H04N 1/00063* (2013.01); *H04N 1/00087* (2013.01);
(Continued)

(58) Field of Classification Search
USPC ........ 358/1.18, 1.13–1.15, 1.9, 406, 504, 1.1, 358/518; 399/72, 38, 43, 44, 46, 85, 1; 347/19; 400/74, 70; 702/89, 182; 709/203
See application file for complete search history.

(56) References Cited

U.S. PATENT DOCUMENTS 7,161,718 B2 * 1/2007 Kise .............................. 358/504
7,224,919 B1 5/2007 Shemirani et al.
(Continued)

FOREIGN PATENT DOCUMENTS

JP 2001-013753 A 1/2001
JP 2002-296984 A 10/2002
(Continued)

OTHER PUBLICATIONS

Japan Patent Office, Office Action for Japanese Patent Application No. 2009-293771 (counterpart Japanese patent application), mailed Dec. 4, 2012.
(Continued)

*Primary Examiner* — Jonathan R Beckley
(74) *Attorney, Agent, or Firm* — Baker Botts L.L.P.

(57) ABSTRACT

In the image-forming system, each image-forming device is selectively capable of performing a test print process to form a test image and an image print process to form an image based on image data. Each image-forming device is configured to be set an execution condition that defines a condition to execute the test print process. Each image-forming device executes the test print process when the each image-forming device satisfies the execution condition. The first detecting unit is configured to detect an execution condition of an image-forming device among the plurality of image-forming devices. The setting unit is configured to set an execution condition of an image-forming device among the plurality of image-forming devices based on the execution condition detected by the first detecting unit such that at least two execution conditions among execution conditions of the plurality of image-forming devices are different from each other.

13 Claims, 10 Drawing Sheets

(51) Int. Cl.
*H04N 1/00* (2006.01)
*G03G 15/00* (2006.01)
*H04N 1/32* (2006.01)

(52) U.S. Cl.
CPC ...... *H04N 1/00854* (2013.01); *H04N 1/32502* (2013.01); *H04N 1/32523* (2013.01); *H04N 2201/0094* (2013.01); *G03G 15/5087* (2013.01)

(56) References Cited

U.S. PATENT DOCUMENTS

| | | | |
|---|---|---|---|
| 7,271,935 B2 * | 9/2007 | Coons et al. | 358/2.1 |
| 7,952,731 B2 * | 5/2011 | Utsunomiya et al. | 358/1.13 |
| 8,149,480 B2 * | 4/2012 | Shiraishi | 358/504 |
| 8,320,015 B2 * | 11/2012 | Katsuhara | 358/1.9 |
| 8,922,821 B2 * | 12/2014 | Yamazaki | 358/1.16 |
| 2004/0001215 A1 | 1/2004 | Kurotsu | |
| 2004/0114157 A1 * | 6/2004 | Linder et al. | 358/1.9 |
| 2007/0070460 A1 | 3/2007 | Yamada | |
| 2007/0097449 A1 | 5/2007 | Shibata | |
| 2008/0088891 A1 | 4/2008 | Shiraishi | |
| 2009/0086236 A1 | 4/2009 | Ohmiya | |
| 2011/0157625 A1 | 6/2011 | Nishikawa | |

FOREIGN PATENT DOCUMENTS

| | | | |
|---|---|---|---|
| JP | 2002-297358 | A | 10/2002 |
| JP | 2003-149905 | A | 5/2003 |
| JP | 2005-221760 | A | 8/2005 |
| JP | 2006-074394 | A | 3/2006 |
| JP | 2006-163052 | A | 6/2006 |
| JP | 2007-038503 | A | 2/2007 |
| JP | 2007-058284 | A | 3/2007 |
| JP | 2007-140570 | A | 6/2007 |
| JP | 2008-096662 | A | 4/2008 |
| JP | 2008-207486 | A | 9/2008 |
| JP | 2009-086444 | A | 4/2009 |

OTHER PUBLICATIONS

Japan Patent Office, Office Action for Japanese Patent Application No. 2010-181668 (counterpart to above-captioned patent application), mailed Jan. 7, 2014.

* cited by examiner

IMAGE FORMING SYSTEM SETTING CONDITION FOR EXECUTING ACQUISITION PROCESS

CROSS REFERENCE TO RELATED APPLICATION

This application claims priority from Japanese Patent Application No. 2009-293734 filed Dec. 25, 2009. The entire content of the priority application is incorporated herein by reference.

TECHNICAL FIELD

The invention relates to an image-forming device that forms positioning marks for adjusting images, and an image-forming system configured of a plurality of such image-forming devices.

BACKGROUND

There are known conventional image-forming devices that adjust images so that there are no deviations in positions or densities of images formed on a recording medium. For example, procedures for adjusting images include: to form a registration pattern in each color to be used for adjusting the image positions; to acquire an amount of offset (a correction value) between the registration pattern formed in a reference color and each of the registrations patterns formed in target colors; and to correct the position of the images in the target colors based on these correction values.

Here, there is a known problem that time required to acquire the correction values may lead to a decline in printing efficiency. To this effect, Japanese patent application publication No. 2001-013753 discloses a technology to reduce copy time by canceling the process to acquire correction values.

SUMMARY

However, the following problem is inherent in the conventional image-forming device described above. Specifically, the acquisition timing for acquiring the correction values is determined according to circumstances of the image-forming device itself, such as the time that has elapsed or the number of sheets that have been printed since the previous acquisition process. In other words, operating conditions of other image-forming devices are not considered when determining the acquisition timing for acquiring correction values. Consequently, when multiple image-forming devices constituting an image-forming system perform an operation to acquire correction values simultaneously, a user of the system is not able to use any of the image-forming devices.

In view of the foregoing, it is an object of the invention to provide an image-forming device and an image-forming system capable of setting suitable operating conditions for the image-forming device to execute image adjustment after learning the operating conditions of other image-forming devices.

In order to attain the above and other objects, the invention provides an image-forming system. The image-forming system includes a plurality of image-forming devices, a first detecting unit, and a setting unit. The plurality of image-forming devices are connected to a network. Each image-forming device is selectively capable of performing a test print process to form a test image and an image print process to form an image based on image data. Each image-forming device is configured to be set an execution condition that defines a condition to execute the test print process. Each image-forming device executes the test print process when the each image-forming device satisfies the execution condition. The first detecting unit is configured to detect an execution condition of an image-forming device among the plurality of image-forming devices. The setting unit is configured to set an execution condition of an image-forming device among the plurality of image-forming devices based on the execution condition detected by the first detecting unit such that at least two execution conditions among execution conditions of the plurality of image-forming devices are different from each other.

According to another aspect, the invention provides an image-forming system. The image-forming system includes a plurality of image-forming devices and a setting unit. The plurality of image-forming devices are connected to a network. Each image-forming device is selectively capable of performing a test print process to form a test image and an image print process to form an image based on image data. Each image-forming device is set to an execution condition that defines a condition to execute the test print process. Each image-forming device executes the test print process when the each image-forming device satisfies the execution condition. The setting unit is configured to set execution conditions of at least two image-forming devices among the plurality of image-forming devices such that at least two execution conditions among the execution conditions of the at least two image-forming devices are different from each other.

According to still another aspect, the invention provides an image-forming device being configured to be set an execution condition that defines a condition to execute a test print process to form a test image. The image-forming device includes an executing unit, a detecting unit, and a setting unit. The executing unit is selectively capable of performing the test print process and an image print process to form an image based on image data. The detecting unit is configured to detect an execution condition of an external image-forming device. The setting unit is configured to set the execution condition of the image-forming device such that the execution condition of the image-forming device is different from the execution condition of the external image-forming device detected by the detecting unit.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

An image-forming system 500 according to a first embodiment of the invention will be described with reference to FIGS. 1 through 7.

Figure 1:
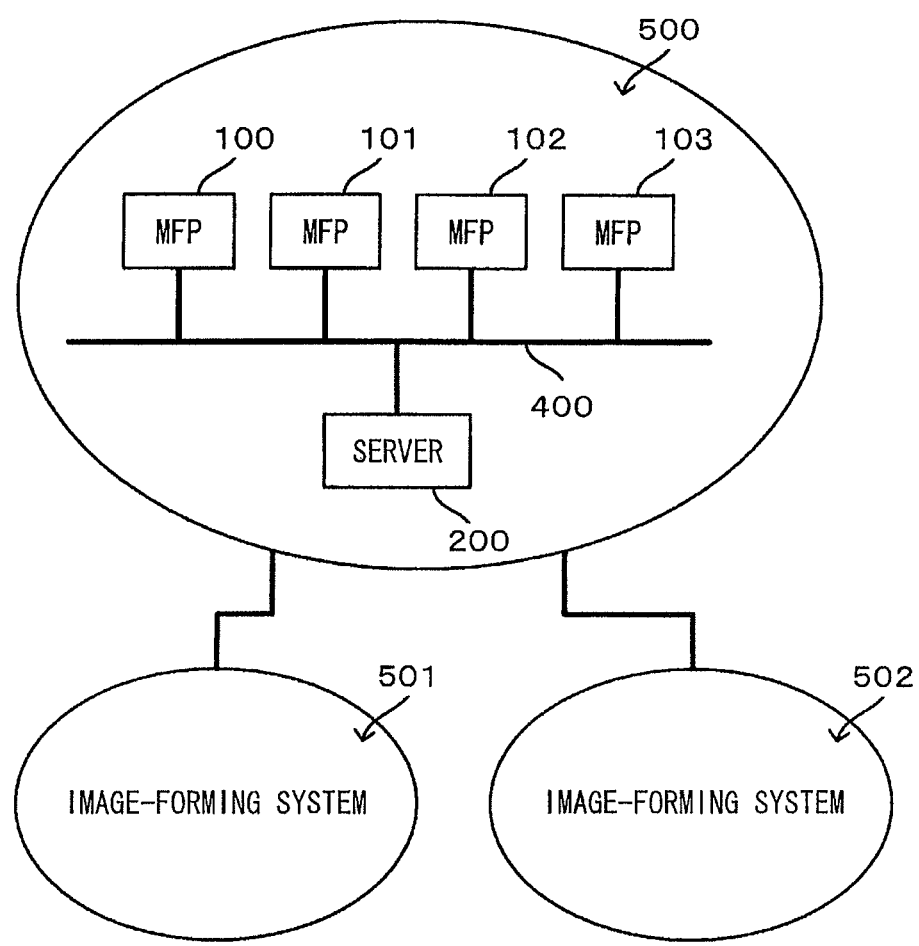
FIG. 1 is a conceptual diagram showing a configuration of an image-forming system according to a first embodiment of the invention.

First, an overall configuration of the image-forming system 500 will be described with reference to FIG. 1. As shown in FIG. 1, the image-forming system 500 includes a plurality of multifunction peripherals (MFPs) 100, 101, 102 and 103, each of which has a color printing function; and a server 200 for controlling the MFPs 100, 101, 102 and 103 belonging to the image-forming system 500. The MFPs 100, 101, 102 and 103 and the server 200 are all connected to a network 400.

The number of image forming devices (other MFPs, as well as printers, and copiers) belonging to the image-forming system 500 may be arbitrary. In addition, other data processors (personal computers, for example) may be connected to the network 400. The image-forming system 500 is also connected to other image-forming systems 501 and 502 via an internet or other network.

Figure 2:
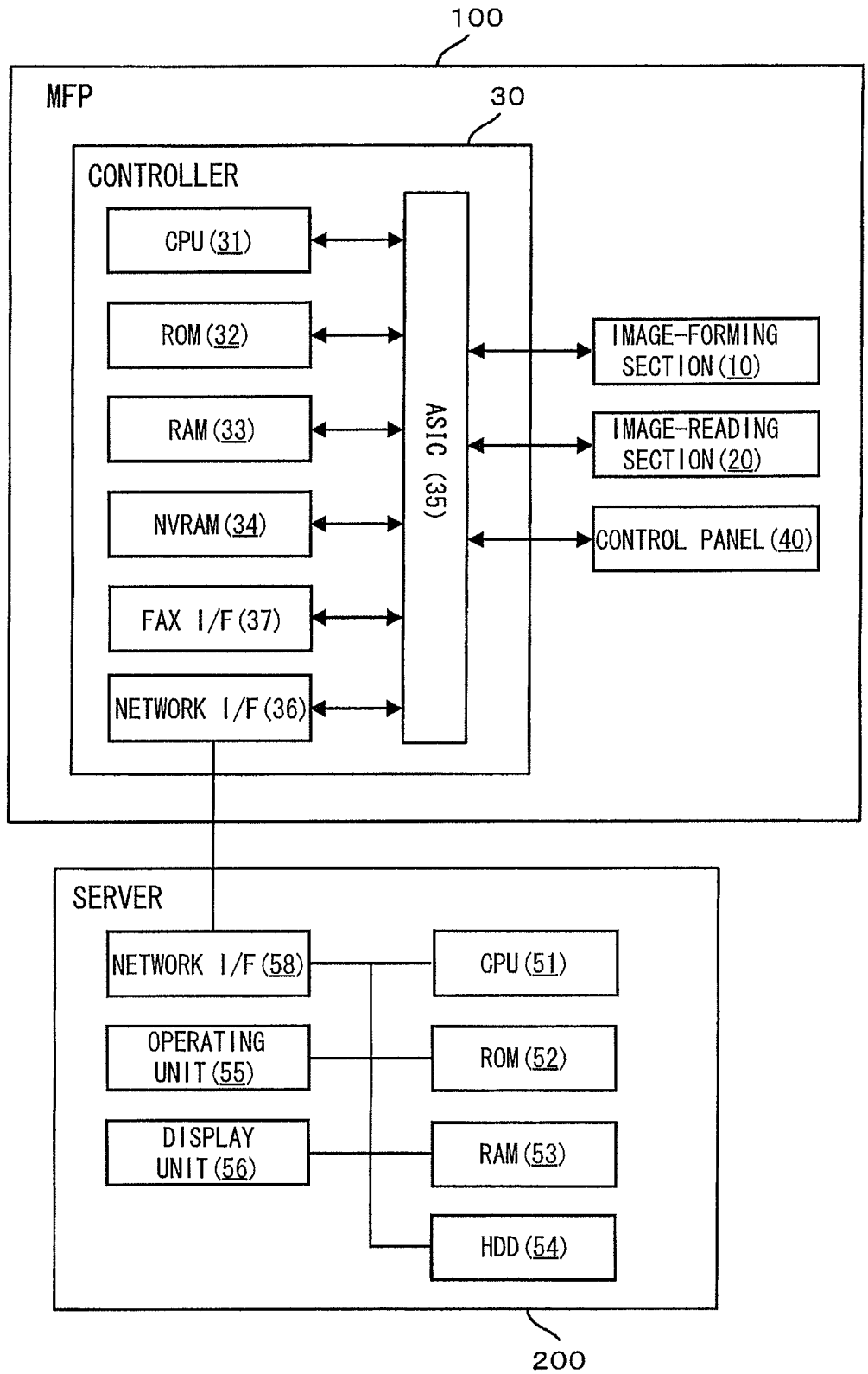
FIG. 2 is a block diagram illustrating electrical configurations of an MFP and a server of the image-forming system according to the first embodiment.

Next, general structures of the MFP 100 and the server 200 will be described with reference to FIG. 2. As shown in FIG. 2, the MFP 100 includes a controller 30, an image-forming section 10, an image-reading section 20 and a control panel 40. The controller 30 is electrically connected to the image-forming section 10, the image-reading section 20 and the control panel 40. The MFPs 101, 102 and 103 have a similar structure to the MFP 100.

The controller 30 has a CPU 31, a ROM 32, a RAM 33, an NVRAM (nonvolatile RAM) 34, an ASIC (application-specific integrated circuit) 35, a network interface 36 and a fax interface 37. The ROM 32 stores various control programs for controlling the MFP 100 and various settings, and initial values. Specifically, the ROM 32 stores a program used when executing an acquisition execution process. The RAM 33 is used as a work area in which the various control programs are loaded, or as a storage area for temporarily storing image data.

The CPU 31 controls various components of the MFP 100 via the ASIC 35 based on processes executed by the control programs read from the ROM 32 and signals received from various sensors while storing the results of processes in the RAM 33 or the NVRAM 34.

The network interface 36 is connected to the network 400 for allowing communications with the server 200 and the like. The fax interface 37 is connected to a telephone network for allowing communications with a destination facsimile machine. The MFP 100 is capable of exchanging data with an external device via the network interface 36 and the fax interface 37.

The image-forming section 10 forms images on paper and the image-reading section 20 reads images from original documents. The control panel 40 accepts user-input operations and displays operating status of the MFP 100.

As also shown in FIG. 2, the server 200 includes a CPU 51; a ROM 52; a RAM 53; a hard disk drive (HDD) 54; an operating unit 55 configured of a keyboard, mouse, and the like; a display unit 56 configured of a liquid crystal display or the like; and a network interface 58.

An operating system (OS), device drivers for controlling various devices, and application programs are installed on the HDD 54 of the server 200. In particular, a program used when executing an initialization process and a control program used when executing an acquisition control process for controlling the MFPs 100, 101, 102 and 103 belonging to the image-forming system 500 are installed on the server 200.

Next, a general structure of the image-forming section 10 in the MFP 100 will be described with reference to FIG. 3. The image-forming section provided in each of the MFPs 101, 102 and 103 has a similar structure to the image-forming section 10 provided in the MFP 100.

Figure 3:
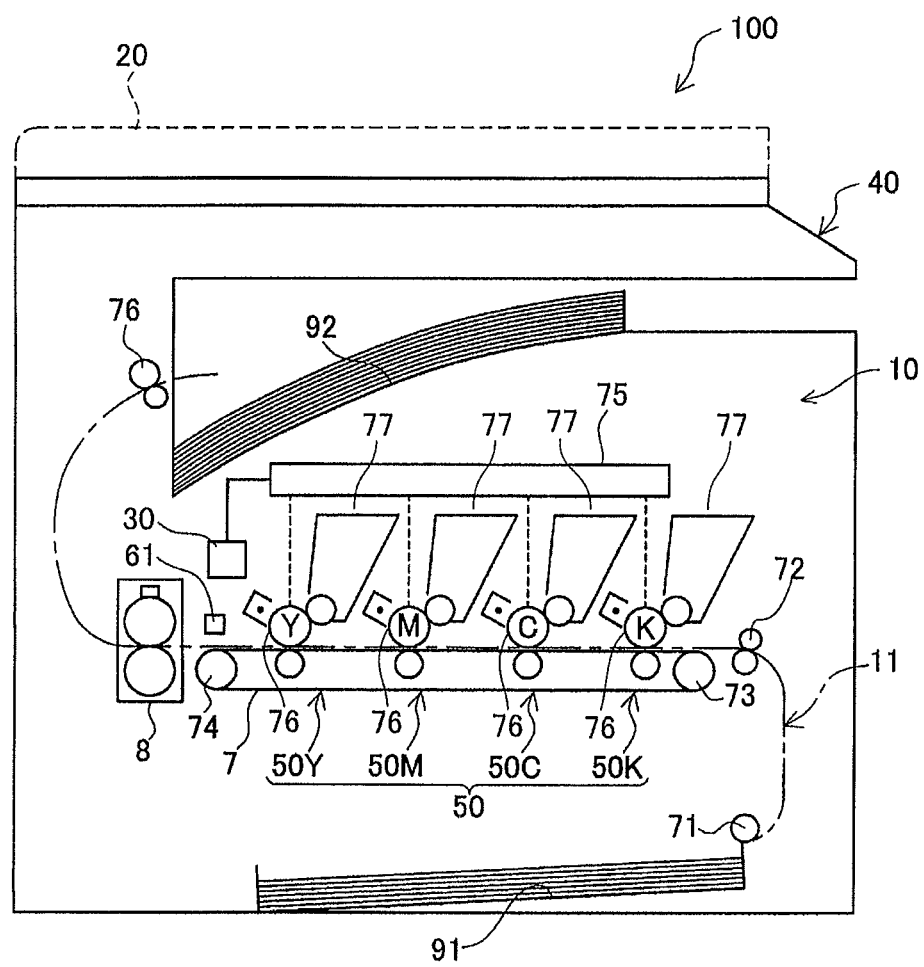
FIG. 3 is a conceptual diagram showing a general configuration of an image-forming section of the MFP according to the first embodiment.

As shown in FIG. 3, the image-forming section 10 includes a process section 50 for forming toner images according to an electrophotographic system and for transferring these toner images onto paper; a fixing unit 8 for fixing the transferred toner images to the paper; a paper tray 91 accommodating sheets of paper on which images have not yet been transferred; and a discharge tray 92 for retaining sheets of paper after images have been transferred thereon. The image-reading section 20 is disposed in the MFP 100 above the image-forming section 10.

A substantially S-shaped paper-conveying path 11 indicated by a chain line in FIG. 3 is formed inside the image-forming section 10. As shown in FIG. 3, the paper-conveying path 11 extends from one end of the paper tray 91 disposed in the bottom of the MFP 100 (an upstream end) to a point near the discharge tray 92 formed on the top of the image-forming section 10 (a downstream end). A direction in which the sheet is conveyed from the upstream end and downstream end along the paper-conveying path 11 is referred to as a sheet-conveying direction. The image-forming section 10 also accommodates a pickup roller 71 disposed at the upstream end of the paper-conveying path 11 above the corresponding end of the paper tray 91, a pair of registration rollers 72 disposed upstream of the process section 50 in the sheet-conveying direction, and a pair of discharge rollers 76 disposed near the downstream end of the paper-conveying path 11. The pickup roller 71 picks up the sheets of paper accommodated in the paper tray 91 and feeds the sheets in the sheet-conveying direction to the registration rollers 72, which convey the sheets through the process section 50 and the fixing unit 8 to the discharge rollers 76. The discharge rollers 76 discharge the sheets onto the discharge tray 92.

The process section 50 is capable of forming color images on the sheets of paper. Specifically, the process section 50 includes process sections corresponding to each of the colors yellow (Y), magenta (M), cyan (C), and black (K) juxtaposed horizontally and parallel to one another. The process section 50 specifically includes a process section 50Y for forming images in the color yellow, a process section 50M for forming images in the color magenta, a process section 50C for forming images in the color cyan, and a process section 50K for forming images in the color black. The process sections 50Y, 50M, 50C, and 50K are disposed at fixed intervals in the sheet-conveying direction.

The image-forming section 10 also includes an exposure device 75 for irradiating light onto each of the process sections 50Y, 50M, 50C, and 50K; a conveying belt 7 for conveying the sheets of paper to transfer positions in each of the process sections 50Y, 50M, 50C, and 50K; and mark sensors 61 for detecting registration patterns formed on the conveying belt 7.

The process section 50 is provided with photosensitive members 76 for each of the corresponding colors, chargers for applying a uniform charge to surfaces of the corresponding photosensitive members 76 and developing devices 77. The charged surfaces of the photosensitive members are then exposed to light emitted from the exposure device 75 to form electrostatic latent images on the photosensitive members 76 corresponding to the images to be formed on paper. The developing devices 77 supply toner onto the photosensitive members 76, developing the electrostatic latent images carried on the photosensitive members into visible toner images.

The conveying belt 7 is an endless belt member that is mounted over conveying rollers 73 and 74 disposed therewithin. The conveying belt 7 is formed of a synthetic resin material such as polycarbonate. When the conveying roller 74 is driven to rotate, the conveying belt 7 circulates in a counterclockwise direction of FIG. 3. Consequently, each sheet of paper conveyed onto the conveying belt 7 is conveyed from the registration rollers 72 side of the conveying belt 7 to the fixing unit 8 side.

With this construction, the image-forming section 10 picks up one sheet of paper at a time from the paper tray 91 and conveys this sheet of paper onto the conveying belt 7. Toner images formed in the process section 50 are subsequently transferred onto the sheet of paper. At this time, in a color printing operation, toner images formed in each of the process sections 50Y, 50M, 50C, and 50K are transferred to and superimposed on the sheet of paper. In black-and-white printing, on the other hand, a toner image is formed only in the process section 50K and transferred onto the sheet of paper. After the toner images have been transferred onto the sheet of paper, the sheet is conveyed to the fixing unit 8 at which the toner images are thermally fixed to the sheet. Subsequently, the sheet is discharged onto the discharge tray 92.

The mark sensors 61 are positioned downstream of the process sections 50Y, 50M, 50C, and 50K in the sheet-conveying direction, but upstream of the fixing unit 8. The mark sensors 61 serve to detect registration patterns that have been formed on the conveying belt 7.

Figure 4:
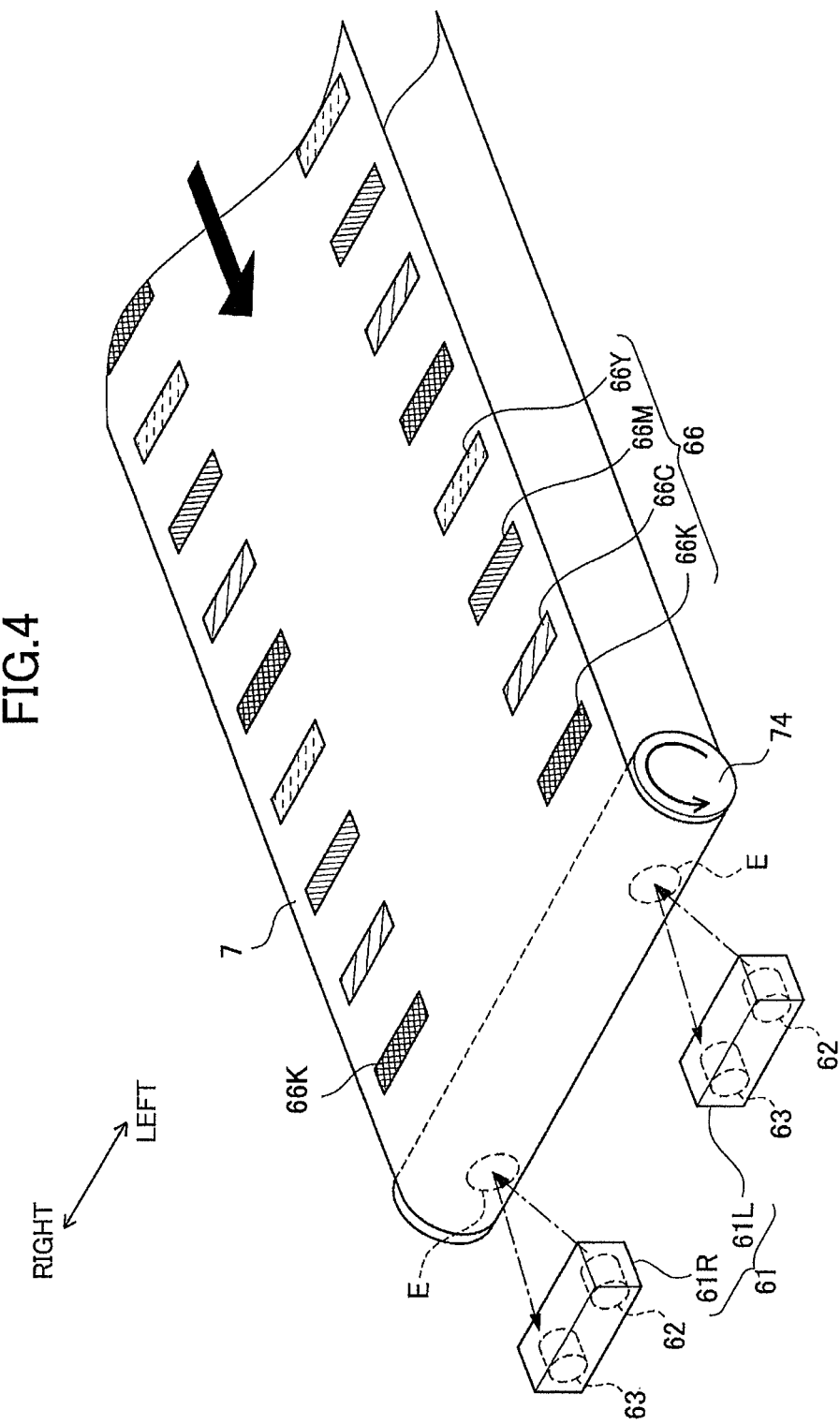
FIG. 4 is a conceptual view showing arrangement of mark sensors of the MFP shown in FIG. 3.

As shown in FIG. 4, the mark sensors 61 include a right sensor 61R and a left sensor 61L. The right sensor 61R is disposed on a widthwise right side of the conveying belt 7, while the left sensor 61L is disposed on a widthwise left side of the conveying belt 7. Each of the sensors 61R and 61L is a reflective photosensor that includes a light-emitting element 62 (an LED, for example) and a light-receiving element 63 (a phototransistor, for example) as a pair. With the mark sensors 61 having this construction, each light-emitting element 62 emits light so as to irradiate the surface of the conveying belt 7 at an oblique angle within a corresponding region E enclosed by a dashed line in FIG. 4, and the corresponding light-receiving element 63 receives the light reflected off the surface of the conveying belt 7. The mark sensors 61 can detect registration patterns 66 (to be described next) formed on the surface of the conveying belt 7 when the registration patterns 66 pass through the regions E based on differences in amounts of reflected light detected by the light-receiving elements 63 when the light passes through each registration pattern 66 and when the light is directly reflected off the conveying belt 7.

Next, a process performed on the MFP 100 to correct registration offset will be briefly described. Registration correction is a process performed to adjust the positions of images formed in each color. The registration correction process is divided into an acquisition process for acquiring an amount of offset for each color relative to a reference color, and a correction process for correcting the position of the image for each color based on the corresponding offset. The acquisition process is performed when a predefined condition for execution has been met. For example, the condition for execution may be determined according to the amount of elapsed time or the number of pages printed since the previous acquisition process, a change in ambient conditions such as temperature or humidity, or the amount of residual toner. The correction process is executed for each printing operation. The acquisition process, and not the correction process, will be described herein.

At the beginning of the acquisition process, each of the process sections 50Y, 50M, 50C, and 50K forms registration patterns 66 on the surface of the conveying belt 7. The registration pattern 66 is an image used for registration correction. Specifically, as shown in FIG. 4, the registration pattern 66 is a group of marks juxtaposed in a subscanning direction (the direction in which the conveying belt 7 moves, as indicated by a solid arrow in FIG. 4). More specifically, each registration pattern 66, in this example shown in FIG. 4, includes a single mark 66K formed by the process section 50K, a single mark 66Y formed by the process section 50Y, a single mark 66M formed by the process section 50M, and a single mark 66C formed by the process section 50C.

The registration patterns 66 are formed at fixed intervals in the subscanning direction. Each of the marks 66K, 66Y, 66M, and 66C in the first embodiment is formed in a rectangular bar-shape elongated in a main scanning direction orthogonal to the subscanning direction.

The MFP 100 detects the position of each of the marks 66K, 66Y, 66M, and 66C based on binary signals outputted from the mark sensors 61. Then, the MFP 100 calculates the interval in the subscanning direction between the mark for each color targeted for adjustment (marks 66Y, 66M, and 66C, for example) and the mark of the reference color (mark 66K, for example). The interval between marks for the reference color and the adjustment color changes when there is registration offset in the subscanning direction. Thus, the amount of registration offset in the subscanning direction for the adjustment color relative to the reference color can be specified based on the interval between marks for the reference color and the adjustment color.

The form of the registration patterns 66 described above is merely an example, and the invention is not limited to this form. The marks formed on the conveying belt 7 in the above process may be any common image pattern that can be used for correcting registration offset and density.

Next, an operation to control the acquisition processes executed by all the MFPs in the image-forming system 500 will be described with reference to FIGS. 5 through 7.

In the embodiment, execution conditions for the acquisition process are set to the MFPs 100, 101, 102, and 103 in the RAM 33 or the NVRAM 34, for example. As described above in the acquisition process of the process to correct registration offset, there is a need to form a plurality of marks and to detect the positions of these marks. Once the acquisition process is started, the MFP cannot perform a printing operation for a prescribed time period. Consequently, if multiple MFPs belonging to the image-forming system 500 were to execute this acquisition process simultaneously, the number of MFPs that can perform a printing operation may be significantly reduced, causing great inconvenience to users. Therefore, in the image-forming system 500 according to the first embodiment, the server 200 controls the timings at which the acquisition processes are executed on the MFPs 100, 101, 102 and 103, while checking execution conditions for the same.

More specifically, the server 200 monitors the execution conditions of the MFPs 100, 101, 102 and 103, and modifies the execution conditions of the same so that the time periods in which the acquisition processes are executed on each of the MFPs 100, 101, 102 and 103 do not overlap.

Hereinafter, a process performed on the image-forming system 500 for implementing the operations to control execution of the above acquisition processes will be described as a process executed on the MFP side (the acquisition execution process) and a process executed on the server side (the initialization process and the acquisition control process).

First, the initialization process executed on the server 200 for setting initial execution conditions for the MFPs 100, 101, 102, and 103 belonging to the image-forming system 500 will be described with reference to the flowchart in FIG. 5. The CPU 51 of the server 200 begins executing the initialization process when the server 200 is started up.

Figure 5:
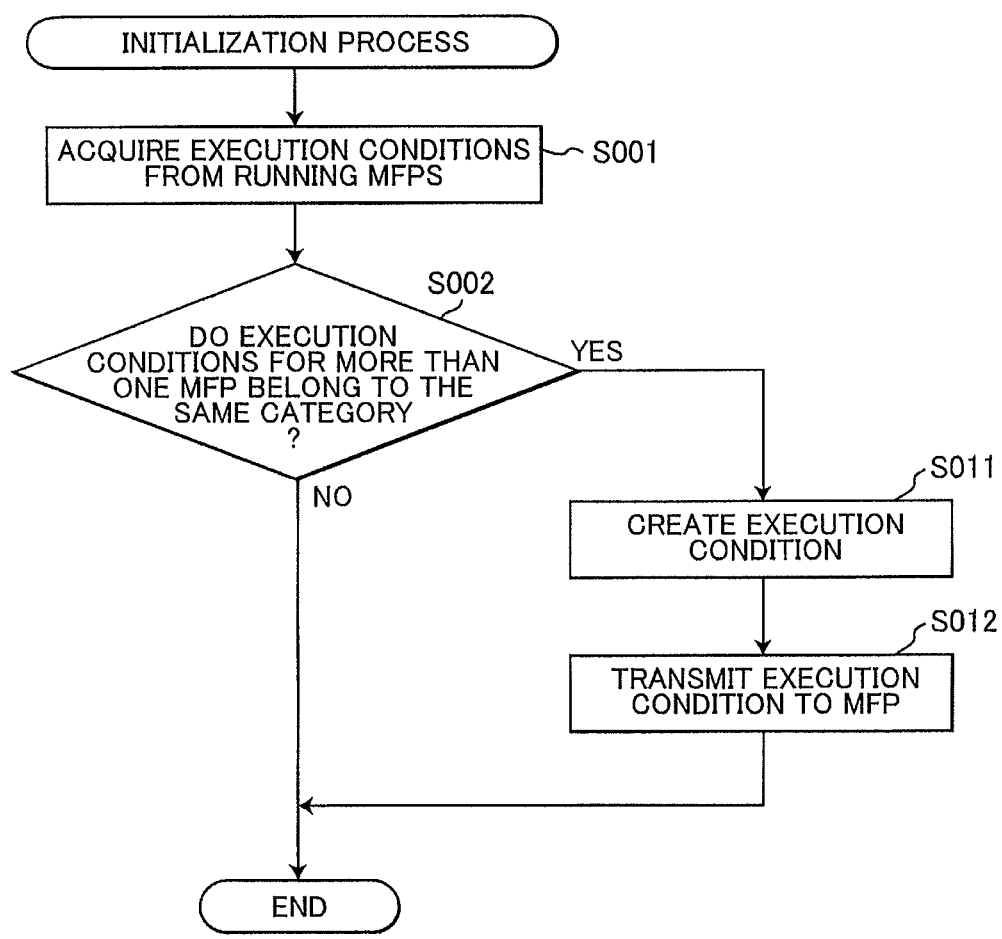
FIG. 5 is a flowchart of an initialization process executed by the server.

In S001 of the initialization process shown in FIG. 5, the CPU 51 searches for MFPs in the image-forming system 500 that are currently running, and acquires execution conditions from the running MFPs. In the process of S001, the CPU 51 simply checks for MFPs that are currently operating, regardless of whether the MFPs are print-ready or not. In S002 the CPU 51 compares the execution condition acquired from each MFP in S001 to the execution conditions acquired from other MFPs and determines whether the execution conditions for more than one MFP belong to the same category. If there are no two MFPs with execution conditions belonging to the same category (S002: NO), the CPU 51 ends the initialization process. Here, each execution condition is classified into one of the categories. Each category defines at least one parameter. The execution condition is determined by setting the parameter defined in the category that the execution condition belongs to. Examples of categories for execution conditions are time, elapsed time since the last acquisition process was performed, running time since the MFP was started up, number of sheets printed since the last acquisition process, amount of residual toner, internal temperature, internal humidity, or a combination of these categories. For example, the category "time" defines a parameter of time that takes value, such as, 9:00 a.m.

However, if execution conditions for more than one MFP belong to the same category (S002: YES), in S011 the CPU 51 creates execution conditions belonging to mutual discrete categories for the MFPs, so that each of the MFPs found in S002 to have an execution condition of the same category is assigned an execution of a category different from the other MFPs. Thus, in S011 the CPU 51 selects a different category for each MFP from among the available categories.

After creating the execution condition, in S012 the CPU 51 transmits this condition to the corresponding MFP and subsequently ends the process. Through this process, each running MFP can be provided with an execution condition of a category different from the other MFPs.

Next, an acquisition execution process performed on each of the MFPs 100, 101, 102, and 103 will be described with reference to the flowchart in FIG. 6. The CPU 31 of the MFP executes the acquisition execution process periodically at prescribed time intervals (every minute, for example).

Figure 6:
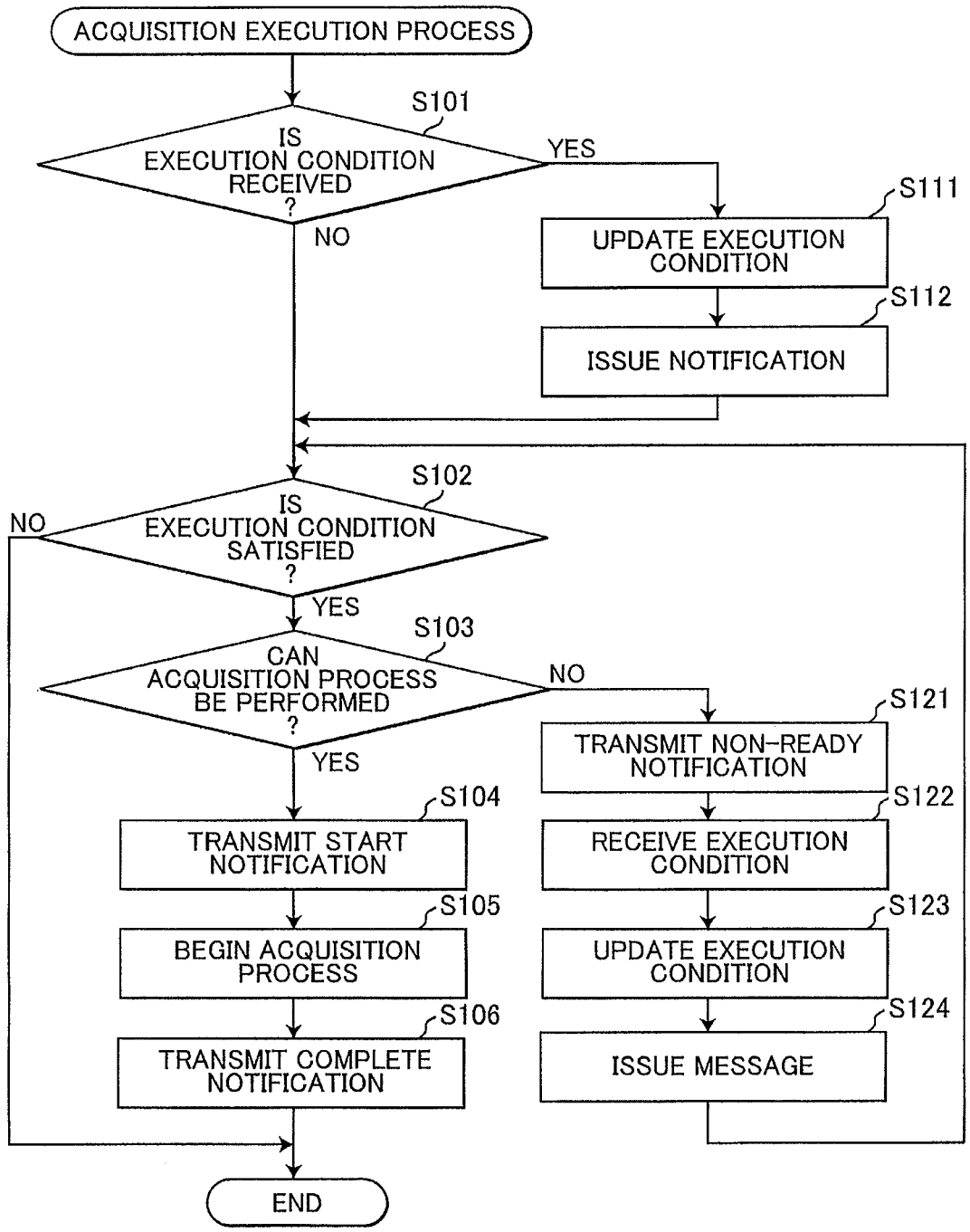
FIG. 6 is a flowchart of an acquisition execution process executed by the MFPs according to the first embodiment.

In S101 at the beginning of the acquisition execution process shown in FIG. 6, the CPU 31 determines whether an execution condition has been received from the server 200. If an execution condition has been received (S101: YES), in S111 the CPU 51 sets the received execution condition as the new execution condition. In S112 the CPU 31 displays a message to notify the user that the execution condition has been updated. In this process, the message may be displayed on the control panel 40 of the MFP or on the display of a data processor, such as a personal computer, belonging to the image-forming system 500. A description of the execution condition or a timing to execute the execution process may also be included in the message. In other words, since the execution condition is automatically changed in S111, in S112 the CPU 31 issues the notification so that the user is aware that the execution condition has changed.

After issuing the message in S112 or if an execution condition has not been received in S101 (S101: NO), then in S102 the CPU 31 determines whether the execution condition currently set for the MFP has been satisfied. For example, if the category of the execution condition is Printed Page Number, and the number set as the execution condition is 100 pages, in this case the CPU 31 determines whether 100 pages have been printed since the acquisition process was last executed. On the other hand, if the category of the execution condition is Elapsed Time, and the elapsed time is set to 2 hours as the execution condition, then the CPU 31 determines whether 2 hours has elapsed since the last time the acquisition process was executed. If the CPU 31 determines in S102 that the execution condition has not been satisfied (S102: NO), the CPU 31 ends the process.

However, when the execution condition has been satisfied (S102: YES), in S103 the CPU 31 determines whether an acquisition process can be performed. Examples of cases in which the acquisition process cannot be executed include cases in which the MFP is out of toner or cases in which a malfunction, such as a paper jam, has occurred. When the acquisition process cannot be executed (S103: NO), in S121 the CPU 31 transmits a "not-ready" notification to the server 200 indicating that the process cannot be executed and subsequently in S122 waits until a new execution condition has been received from the server 200. That is, the CPU 31 requires the server 200 to change the execution condition by transmitting the "not-ready" notification. In other words, the "not-ready" notification indicates the requirement to change the execution condition.

Once a new execution condition is received in S122, in S123 the CPU 31 sets the received execution condition as the new condition for the MFP to which the CPU 31 belongs. In S124 the CPU 31 issues a message notifying the user that the execution condition has been updated, and subsequently returns to S102.

However, when the acquisition process can be executed (S103: YES), in S104 the CPU 31 transmits a "start" notification to the server 200, indicating that the acquisition process will begin. In S105 the CPU 31 begins executing the acquisition process. After the acquisition process, in S106 the CPU 31 transmits a "complete" notification to the server 200 indicating that the acquisition process has been completed, and subsequently ends the current process.

Next, the acquisition control process executed on the server 200 will be described with reference to the flowchart in FIG. 7. The CPU 51 of the server 200 executes the acquisition control process periodically at prescribed intervals (one minute, for example).

Figure 7:
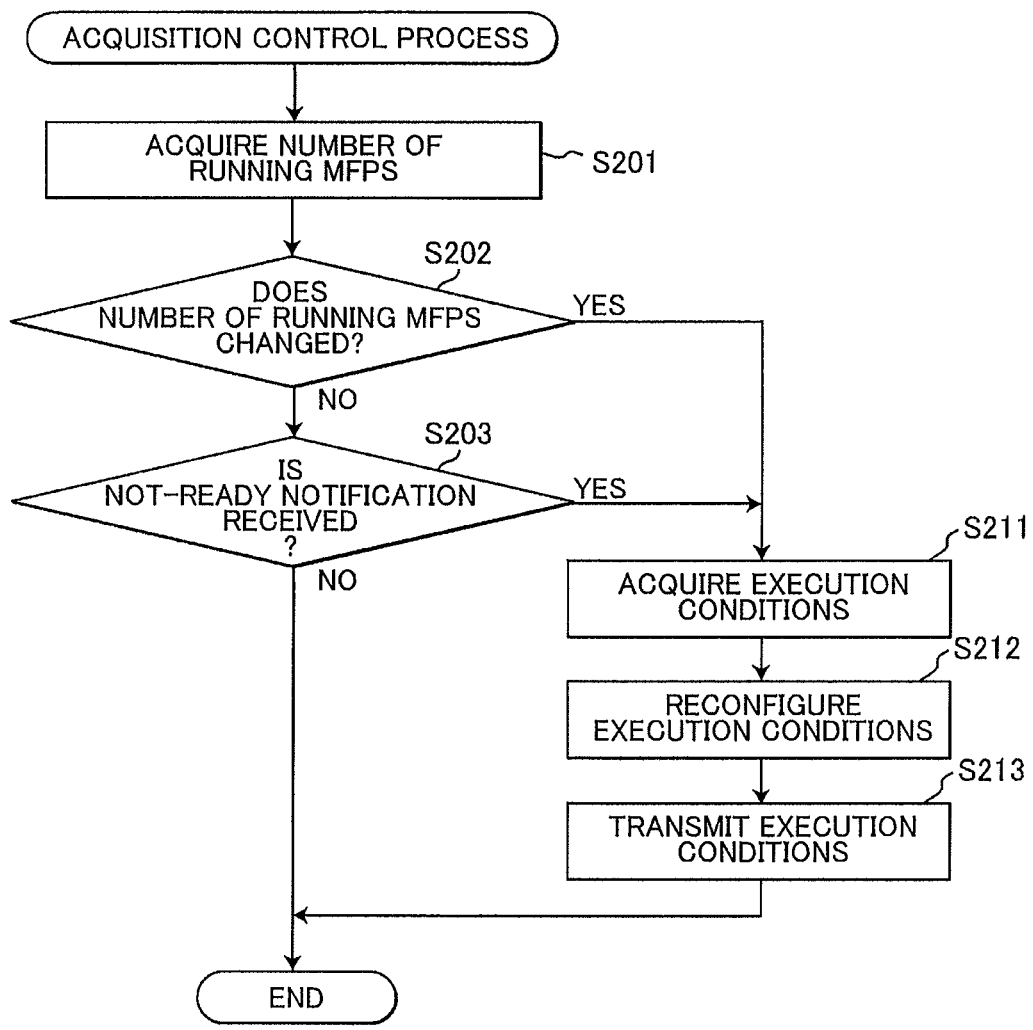
FIG. 7 is a flowchart of an acquisition control process executed by the server according to the first embodiment.

In S201 at the beginning of the acquisition control process in FIG. 7, the CPU 51 acquires the number of MFPs in the image-forming system 500 that are currently running. In S202 the CPU 51 determines whether the number of running MFPs has changed. That is, in S202 the CPU 51 determines whether the current number of running MFPs is different from the number of MFPs that was obtained in the previously executed S202. Here, the "number" of MFPs may be the number of devices or the ratio of running MFPs to the total number of MFPs registered to the image-forming system 500. If the number of running MFPs has notchanged (S202: NO), in S203 the CPU 51 determines whether a "not-ready" notification has been received from one of the running MFPs. If a "not-ready" notification was not received (S203: NO), the CPU 51 ends the current process.

However, if the number of running MFPs has changed (S202: YES) or if a "not-ready" notification has been received from one of the MFPs (S203: YES), then in S211 the CPU 51 ask each running MFP their execution condition and then acquires the execution conditions from the running MFPs. In S212 the CPU 51 reconfigures the execution conditions for the running MFPs so that each MFP has an execution condition belonging to a different category.

For example, when an MFP in the image-forming system 500 that was not previously running is started up, increasing the number of running MFPs, the CPU 51 checks the category of the execution condition for the new MFP. If this category matches the category of the execution condition assigned to another MFP that was already running, the CPU 51 creates an execution condition of a category different from this category.

Further, if the CPU 51 receives a "not-ready" notification from an MFP in the image-forming system 500, the CPU 51 adjusts the execution conditions for MFPs in the image-forming system 500 other than the MFP from which the "not-ready" notification was received so that these execution conditions are not satisfied in the very near future. In other words, if the execution condition for another MFP is about to be satisfied, then the image-forming system 500 will include an MFP executing an acquisition process and an MFP that is not print-ready, reducing the number of MFPs that are available to print. Hence, since the CPU 51 has confirmed the image-forming system 500 has an MFP that is not print-ready, the CPU 51 modifies execution conditions for other MFPs in the image-forming system 500 so that these execution conditions are unlikely to be satisfied in the very near future. The CPU 51 also adjusts the execution condition for the MFP from which the "not-ready" notification was received so that this MFP can execute an acquisition process soon after being restored to a print-ready state. After reorganizing the execution conditions, in S213 the CPU 51 transmits the new execution conditions to the respective MFPs and subsequently ends the process.

As described above, the server 200 in the image-forming system 500 according to the first embodiment sets a condition for executing an acquisition process for each MFP in the image-forming system 500 to a mutually discrete category. Accordingly, it is extremely unlikely that MFPs belonging to the image-forming system 500 will begin executing an acquisition process simultaneously, thereby reducing the likelihood of the image-forming system 500 having a low number of print-ready MFPs available.

Further, by setting an execution condition of a different category for each MFP, the image-forming system 500 will possess a suitable MFP for each category, thereby increasing the reliability of the overall image-forming system 500 for producing high-quality images. Specifically, if MFPs in the image-forming system 500 are configured with execution conditions for only the category of Printed Page Number, the image-forming system 500 will not have any MFP that can support sudden changes in temperature. Conversely, if the execution conditions are set only in the category of temperature, the image-forming system 500 will have no MFPs that can support fast, large-volume printing. However, if the execution condition for one MFP is set to the category of Printed Page Number, while the execution condition of another MFP is set to the category of Temperature, there is a much greater likelihood that the image-forming system 500 will have an available MFP capable of high-quality printing, even when there are changes in ambient conditions or when a large-volume print job must be processed within a short timeframe.

Since the server 200 in the first embodiment does not store execution conditions for the respective MFPs, the server 200 must query each MFP for its execution conditions each time the process of S211 is performed. The server 200 may include a database for storing these execution conditions. In this case, in S211 the server 200 confirms the execution conditions of the MFPs by reading this data from the database. The server 200 stores the database in the HDD 54 or the RAM 53, for example.

In the acquisition control process according to the first embodiment, the server 200 acquires the number of currently running MFPs in the image-forming system 500. However, the server 200 may further determine which of the running MFPs is actually print-ready and modify the execution conditions for the MFPs when the number of print-ready MFPs changes.

Second Embodiment

Next, a server according to a second embodiment of the invention will be described. When setting execution conditions during the initialization process described in the first embodiment, the server according to the second embodiment creates and sets execution conditions for all running MFPs. In other words, unlike the server according to the first embodiment, the server according to the second embodiment does not check the execution conditions set for each MFP in the initialization process.

Figure 8:
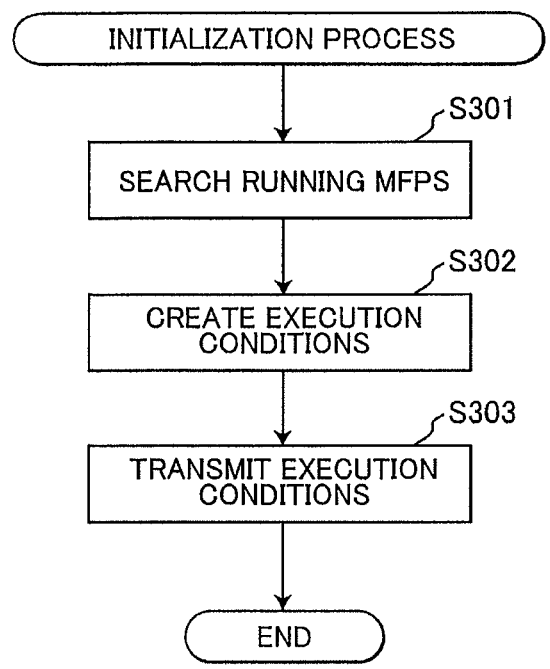
FIG. 8 is a flowchart of an initialization process executed by a server according to a second embodiment of the invention.

FIG. 8 is a flowchart illustrating steps in the initialization process according to the second embodiment. The system configuration in the second embodiment is identical to that in the first embodiment, and the acquisition execution process and the acquisition control process according to the second embodiment are also identical.

In S301 at the beginning of the initialization process in FIG. 8, the CPU 51 of the server 200 searches for MFPs in the image-forming system 500 that are currently operating. Based on this search, the CPU 51 acquires the number of running MFPs. In S301 of the second embodiment, the CPU 51 need only acquire the number of running MFPs in the image-forming system 500 and need not acquire the execution condition set for each MFP.

In S302 the CPU 51 creates execution conditions of a number equivalent to the acquired number of MFPs. Here, the CPU 51 creates an execution condition of a different category for each MFP. The server 200 according to the preferred embodiment has a database for storing the execution condition set for each MFP. Thus, after creating the execution conditions in S302, the CPU 51 stores these conditions in the database. Here, the server 200 stores the database in the HDD 54 or the RAM 53, for example.

In S303 the CPU 51 transmits the execution conditions created in S302 to the running MFPs. Through this process, each running MFP will execute an acquisition process based on an execution condition of a different category from the other MFPs. Accordingly, as in the first embodiment, this configuration will reduce the likelihood of the image-forming system 500 having a small number of MFPs that are print-ready.

Third Embodiment

Figure 9:
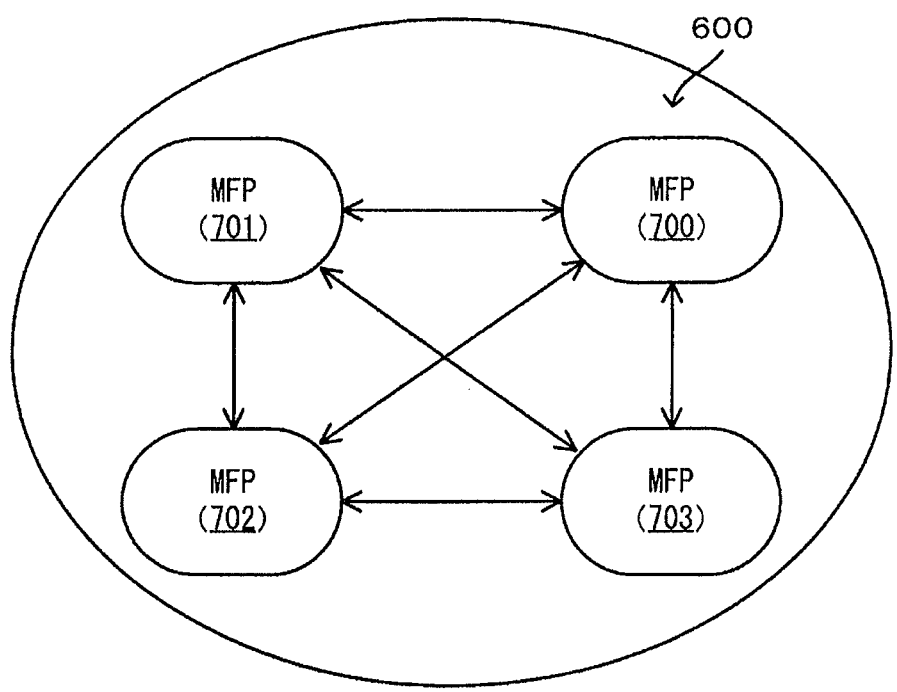
FIG. 9 is a block diagram showing a configuration of an image-forming system according to a third embodiment of the invention.

Next, a third embodiment of the invention will be described. As shown in FIG. 9, an image-forming system 600 according to the third embodiment includes MFPs 700, 701, 702, and 703 that are interconnected and capable of communicating with one another. The image-forming system 600 does not include the server 200 described in the system of the first embodiment. In the third embodiment, each MFP checks the execution conditions of the other MFPs before setting its own execution condition.

Figure 10:
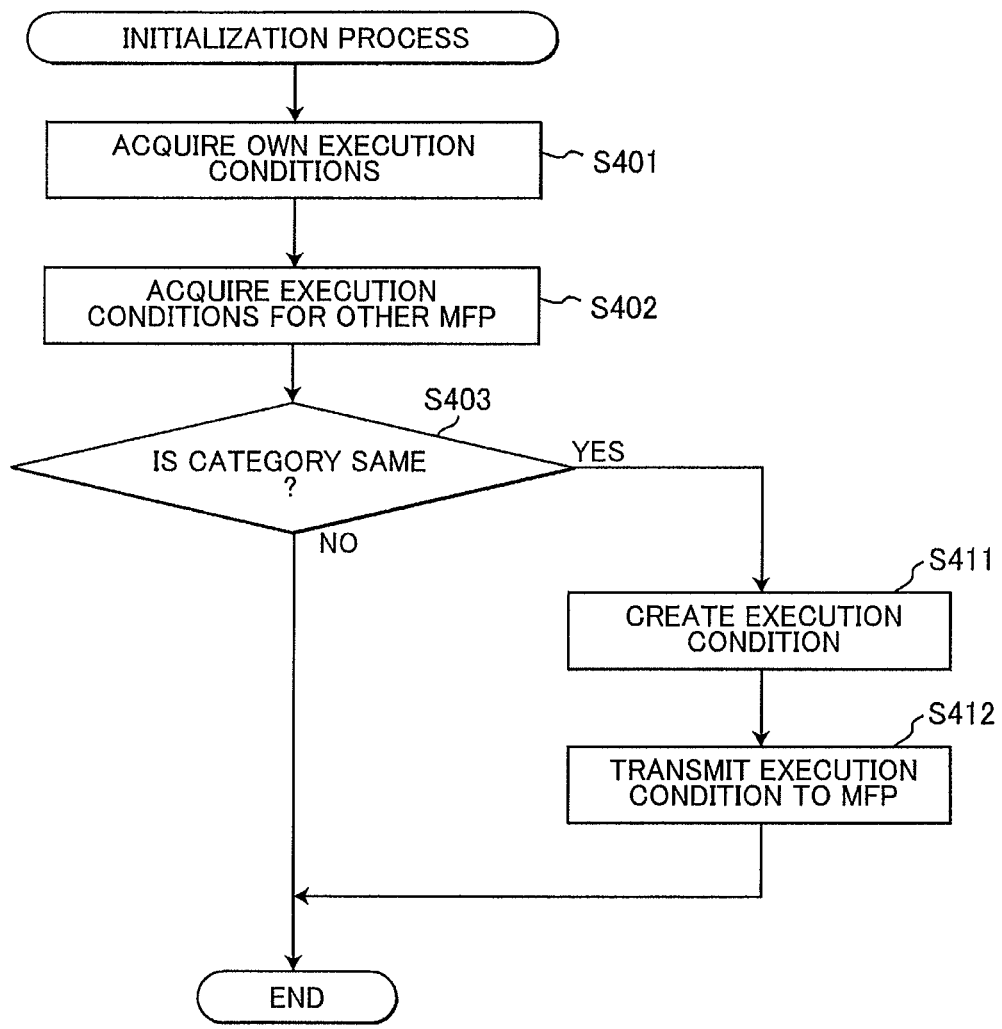
FIG. 10 is a flowchart of an initialization process executed by a server according to the third embodiment.

FIG. 10 illustrates steps in the initialization process performed by each of the MFPs 700, 701, 702, and 703 according to the third embodiment. The configuration of the MFPs 700, 701, 702, and 703 are basically identical to the configuration of the MFPs 100, 101, 102, and 103 except that the ROM 32 of the MPFs 700, 701, 702, and 703 stores a program for an initialization process described below. Each MFP in the third embodiment executes the initialization process when the MFP is started up. In S401 of the initialization process in FIG. 10, the CPU 31 of the MFP acquires the execution condition set as an initial value for the MFP to which the CPU 31 belongs. In S402 the CPU 31 searches for other MFPs in the image-forming system 600 and acquires the execution conditions for other MFPs that are currently running.

In S403 the CPU 31 compares its own execution condition acquired in S401 to the execution conditions of other devices acquired in S402 to determine whether the category of its own execution condition is the same as the category of the execution conditions for other devices. If the category of its own execution condition does not match that of other devices (S403: NO), the CPU 31 ends the current process.

However, if its category matches that of another device (S403: YES), in S411 the CPU 31 creates an execution condition of a category different from the categories used on the other devices. In S412 the CPU 31 sets this execution condition as the new execution condition for its own MFP and subsequently ends the current process.

As an example, if the MFPs 701 and 702 in the image-forming system 600 according to the third embodiment are running when the MFP 700 starts up, the MFP 700 queries the MFPs 701 and 702 for their execution conditions. After acquiring the execution conditions for the MFPs 701 and 702, the MFP 700 sets its own execution condition to a condition in a category different from the categories of the execution conditions acquired from the MFPs 701 and 702. Thereafter, the MFP 700 executes an acquisition process when the execution condition newly set for its own device is satisfied.

According to the third embodiment described above, each individual MFP possesses a server function for acquiring the execution conditions of other MFPs directly in order to set its own execution condition in a category that does not coincide with the categories used by the other MFPs. Hence, this configuration reduces the likelihood of the image-forming system 600 possessing too few MFPs that are print-ready. The third embodiment also reduces the likelihood of the image-forming system 600 possessing too many MFPs of low quality that do not perform an acquisition process for extended periods of time.

As in the first embodiment described above, the image-forming system 600 according to the third embodiment may be configured to adjust execution conditions for other MFPs when one MFP enters a not-ready state. In this case, each of the MFPs 700, 701, 702, and 703 executes the acquisition execution process described in the first embodiment. For example, when the execution condition of an MFP is met, causing the MFP to enter a not-ready state, the MFP transmits a "not-ready" notification to the other MFPs. Upon receiving the "not-ready" notification from this MFP, the other MFPs perform the acquisition control process to modify their own execution conditions so that their conditions will not likely be satisfied right away.

In either the image-forming system 500 or 600 according to the first and second embodiments described above, the condition for executing an acquisition process set for each MFP belonging to the image-forming system is set to a condition of a different type than the conditions set for the other MFPs. That is, a condition for each MFP is different from conditions for other running MFP. Hence, this reduces the likelihood that an acquisition process will be simultaneously executed by a large number of MPFs. Accordingly, this configuration reduces the likelihood that a large number of MFPs constituting the image-forming system will become unable to print at the same time.

While the invention has been described in detail with reference to the embodiments thereof, it would be apparent to those skilled in the art that various changes and modifications may be made therein without departing from the spirit of the invention. For example, the invention may also be applied to an image forming device other than MFP, such as a printer and a copier, provided that the device is provided with a printing function.

Further, while the invention is applied to MFPs having color printing functions in the embodiments described above, the image-forming device according to the invention is not limited to a color printing device. For example, the invention may be applied to a monochrome printing device, provided that the device forms marks used to correct registration error, density, and the like.

While the registration patterns 66 in the above embodiments are formed of bar-shaped marks, the configuration of the registration patterns 66 is not limited to this shape. For example, the registration pattern 66 may be configured of pairs of bar-shaped marks, with at least one mark in the pair sloped at a prescribed angle to the main scanning direction. Using this registration pattern 66, registration errors in the main scanning direction as well as in the subscanning direction can be detected.

Further, the above embodiments describe registration patterns formed as marks on the conveying belt 7 for correcting registration. However, the invention may also be applied to density patterns used to correct irregularities in density, for example. In order to acquire a density correction amount, the MFP forms several marks of varying densities on the conveying belt 7 in each color and detects the amount of light reflected off the marks with the same sensors used for detecting registration errors or with separate photosensors. The MFP detects the density from the intensity of reflected light and calculates the difference between the detected density and the desired density.

Further, in the above embodiments, the invention is applied to MFPs that form marks on a paper-conveying belt. However, the invention may also be applied to an image-forming device having an intermediate transfer belt, whereby the image-forming device forms marks (patterns) on this intermediate transfer belt.

In the embodiments described above, execution conditions are set for all MFPs belonging to the image-forming system 500, but it is not necessary to set an execution condition for each MFP. For example, mutually discrete execution conditions may be set for a prescribed number of MFPs. Alternatively, mutually discrete categories of execution conditions may be set for a prescribed number of MFPs.

The execution conditions may be set such that any two execution conditions are not satisfied simultaneously. Alternatively, the execution conditions may be set such that at least two execution conditions are not satisfied simultaneously.

Further, while the server 200 is provided for managing the MFPs 100, 101, 102 and 103 in the first and second embodiments, one of the MFPs 100, 101, 102, and 103 may be provided with a server function.

In the embodiments described above, execution conditions are set for MFPs so that each MFP has an execution condition belonging to a different category. However, an execution condition belonging to the same category may be provided to each MFP, provided that the value at which the condition is satisfied differs for each MFP. For example, if the category of execution conditions is uniformly set to Time for all MFPs, the time in each execution condition is set to a different value so that the conditions are not satisfied simultaneously by a plurality of MFPs. Alternatively, the category for execution conditions may be set uniformly to Internal Temperature, whereby the temperature is set to a different value for each MFP so that the conditions for multiple MFPs are not satisfied simultaneously. This configuration increases the likelihood that a print-ready image-forming device will be available in the image-forming system.

What is claimed is:

1. An image-forming system comprising:
    a plurality of image-forming devices connected to a network, each image-forming device being configured to selectively perform a test print process to form a test image and an image print process to form an image based on image data, each image-forming device being configured to be set to an execution condition that defines a condition that, when satisfied by an image-forming device, indicates that the test print process should be executed by that image-forming device; and
    a server connected to the plurality of image-forming devices via the network, the server comprising:
        a detecting unit that is configured to detect a number of image-forming devices from among the plurality of image-forming devices that currently are running;
        an acquiring unit that is configured to acquire the execution condition of the number of image-forming devices detected by the detecting unit; and
        a setting unit that is configured to:
            determine the execution condition of each of the number of image-forming devices detected by the detecting unit, and
            when the number of image-forming devices detected by the detecting unit is greater than previously detected by the detecting unit, change the execution condition of a particular image-forming device to an execution condition that is different from an execution condition of an other image-forming device so that at least the particular image-forming device and the other image-forming device are set to different execution conditions,
    wherein each of the plurality of image-forming devices is configured to:
        determine whether the execution condition of that image-forming device is satisfied, and
        perform the test print process when it is determined that the execution condition of that image-forming device is satisfied.

2. The image-forming system according to claim 1, wherein when an image-forming device among the plurality of image-forming devices satisfies the execution condition but is incapable of performing the test print process, the image-forming device outputs to the setting unit a requirement to change the execution condition,
    wherein when the setting unit receives the requirement from the image-forming device, the setting unit newly sets the execution condition of the image-forming device that outputs the requirement.

3. The image-forming system according to claim 1, wherein the setting unit sets the execution conditions of image-forming devices capable of performing the image print process among the plurality of image-forming devices such that any two execution conditions among the execution conditions of image-forming devices capable of performing the image print process are not satisfied simultaneously.

4. The image-forming system according to claim 1, wherein the execution conditions are classified into groups, each group defining a parameter, the execution condition being determined by setting a parameter defined in the group,
    wherein the setting unit sets an execution condition such that at least two execution conditions among execution conditions of the plurality of image-forming devices belong to groups different from each other.

5. The image-forming system according to claim 1, further comprising a notification unit that notifies at least one of information about the execution condition and information about a timing to execute the test print process.

6. The image-forming system according to claim 1, wherein each image-forming device forms a mark to detect positional offset or density offset in the test image in the test print process.

7. The image-forming system according to claim 1, wherein one of the plurality of image-forming devices includes the acquiring unit and the setting unit.

8. An image-forming system comprising:
    a plurality of image-forming devices connected to a network, each image-forming device being configured to selectively perform a test print process to form a test image and an image print process to form an image based on image data, each image-forming device being set to an execution condition that, when satisfied by a corresponding image-forming device, indicates that the test print process should be executed by that image-forming device; and
    a server connected to the plurality of image-forming devices via the network, the server comprising:
        a detecting unit that is configured to detect a number of image-forming devices from among the plurality of image-forming devices that currently are running;
        a setting unit that is configured to:
            determine the execution condition of each of the number of image-forming devices detected by the detecting unit, and
            when the number of image-forming devices detected by the detecting unit is greater than previously detected by the detecting unit, change the execution condition of a particular image-forming device to an execution condition that is different from an execution condition of an other image-forming device so that at least the particular image-forming device and the other image-forming device are set to different execution conditions,
    wherein each of the number of image-forming devices detected by the detecting unit is configured to determine whether the execution condition set by the setting unit is satisfied, and
    wherein each of the number of image-forming devices detected by the detecting unit is configured to perform the test print process when it is determined that the execution condition set by the setting unit is satisfied.

9. A server comprising:
a communication unit that is configured to be connected to a plurality of image-forming devices via the network;
a detecting unit that is configured to detect a number of image-forming devices from among the plurality of image-forming devices that currently are running;
an acquiring unit that is configured to acquire an execution condition of each of the number of image-forming devices detected by the detecting unit, the execution condition defining a condition that, when satisfied by a corresponding image-forming device, indicates that the test print process should be executed by that image-forming device;
a setting unit that is configured to:
   determine the execution condition of each of the number of image-forming devices detected by the detecting unit; and
   when the number of image-forming devices detected by the detecting unit is greater than previously detected by the detecting unit, change the execution condition of a particular image-forming device to an execution condition that is different from each other an execution condition of an other image-forming device so that at least the particular image-forming device and the other image-forming device are set to different execution conditions,
wherein each of the plurality of image-forming devices is configured to:
   determine whether the execution condition of that image-forming device is satisfied, and
   perform the test print process when it is determined that the execution condition of that image-forming device is satisfied.

10. The server according to claim 9, wherein the detecting unit periodically detects the number of active image forming devices at prescribed intervals.

11. The server according to claim 9, wherein the execution condition of the particular image-forming device and the execution condition of the other image-forming device define conditions to execute a process to correct registration offset performed by the corresponding image-forming device, the registration offset indicating offset of printed color relative to reference color.

12. The server according to claim 11, wherein the setting unit sets the execution condition of one of the particular image-forming device and the other image-forming device to be related to temperature, and sets the execution condition of remaining one of the particular image-forming device and the other image-forming device to be related to number of pages that the remaining one of the particular image-forming and the other image-forming device has printed.

13. The server according to claim 11, wherein:
the execution condition of the particular image-forming device is related to temperature in the particular image-forming device,
the execution condition of the other image-forming device is related to temperature in the other image-forming device, and
the setting unit sets the execution condition of the particular image-forming device and the execution condition of the other image-forming device such that temperature at which the execution condition of the particular image-forming device is satisfied is different from temperature at which the execution condition of the other image-forming device is satisfied.

* * * * *